Sept. 20, 1971     B. EDWARDS     3,605,192
CONTINUOUS MOTION CONTAINER MOLDING MACHINE
Filed July 28, 1969     11 Sheets-Sheet 1
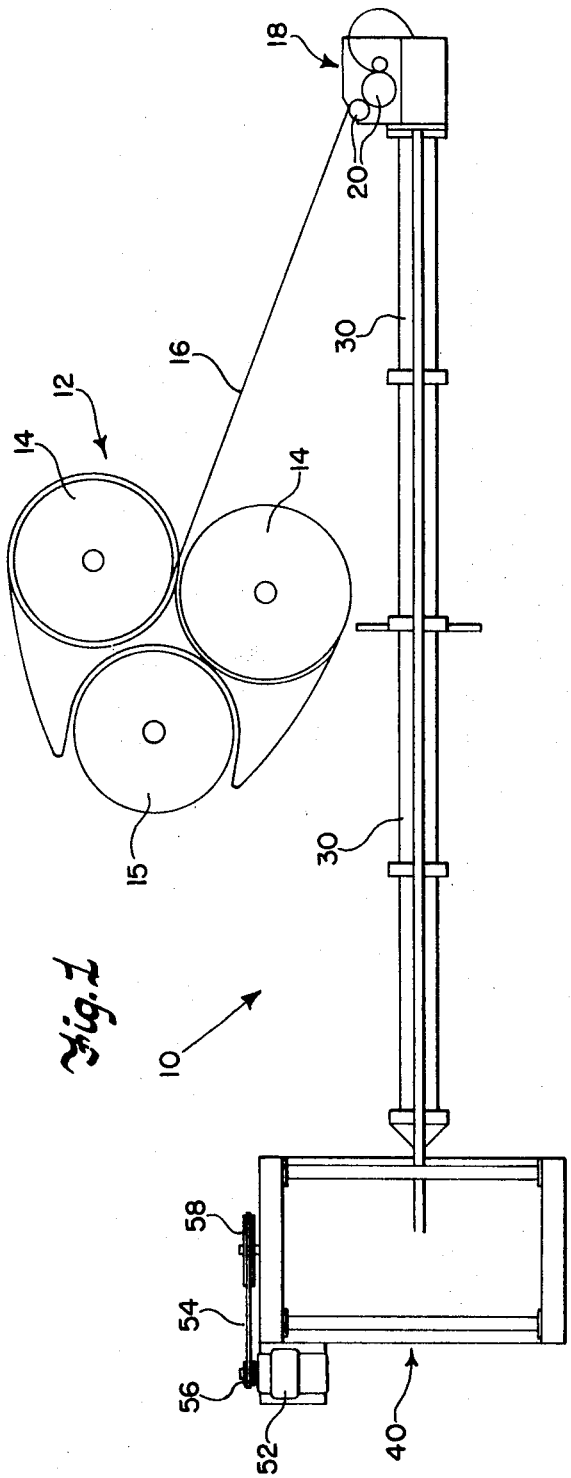
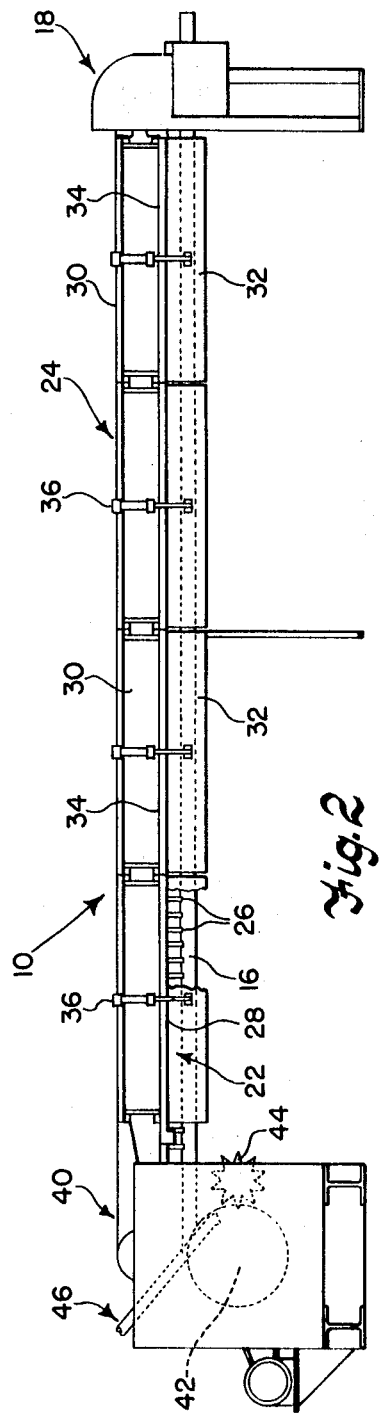
INVENTOR.
Bryant Edwards
BY
His Att'ys

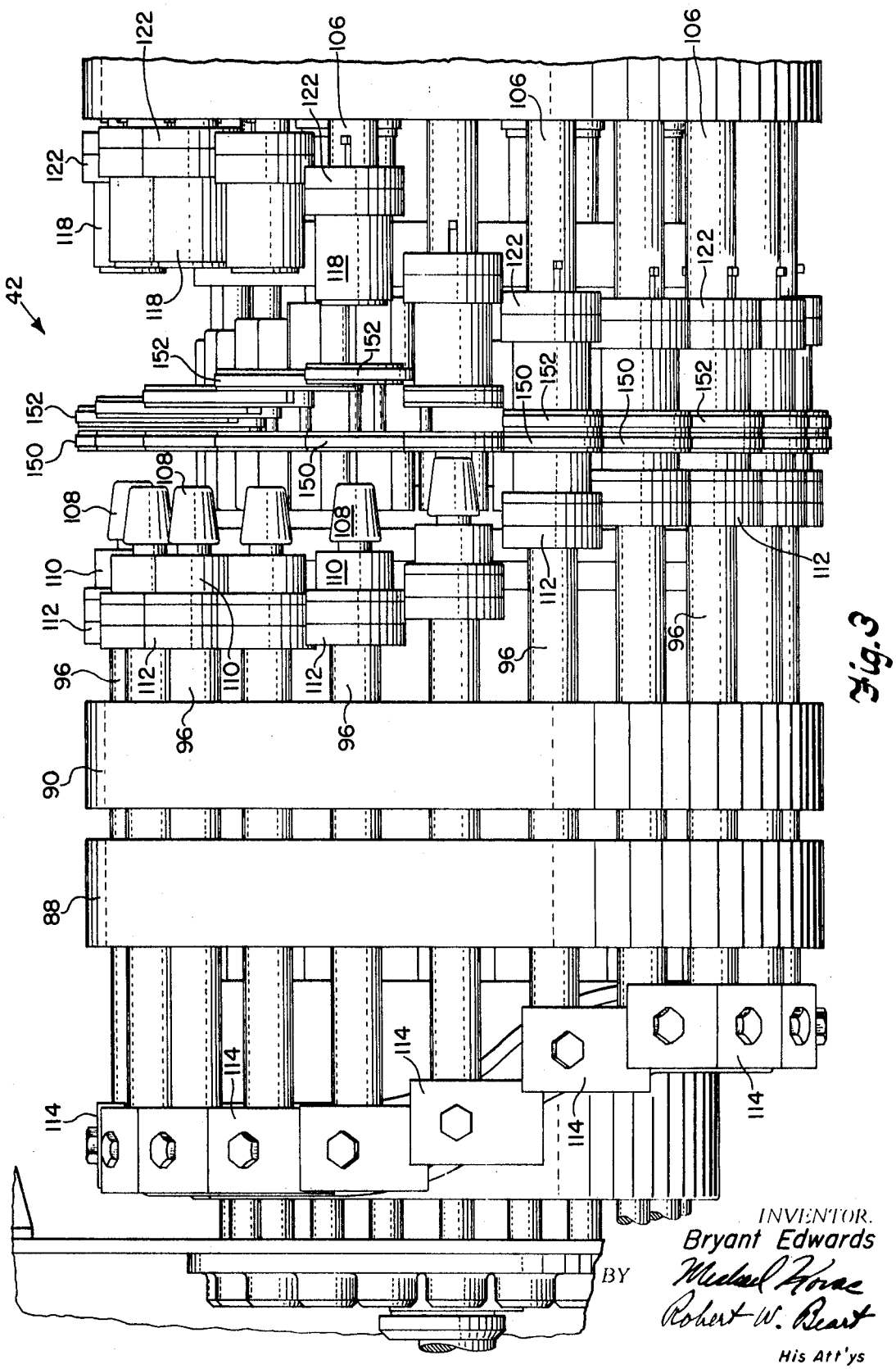

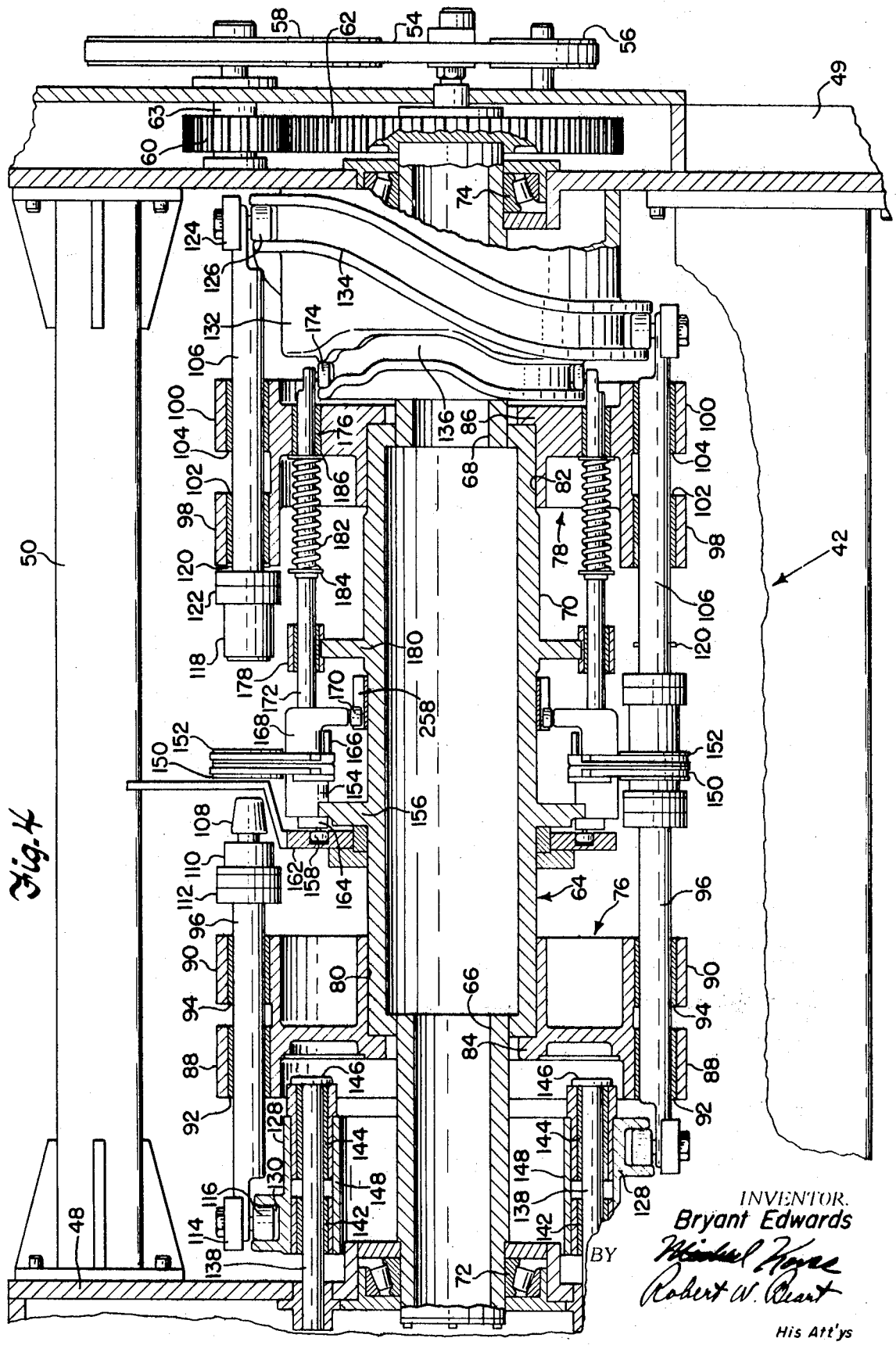

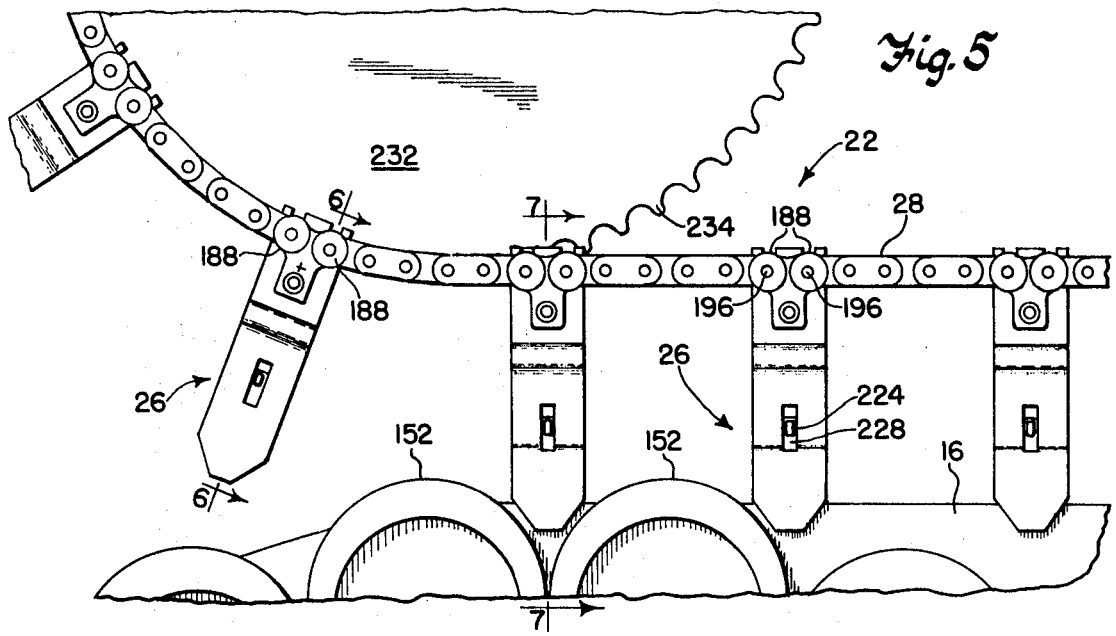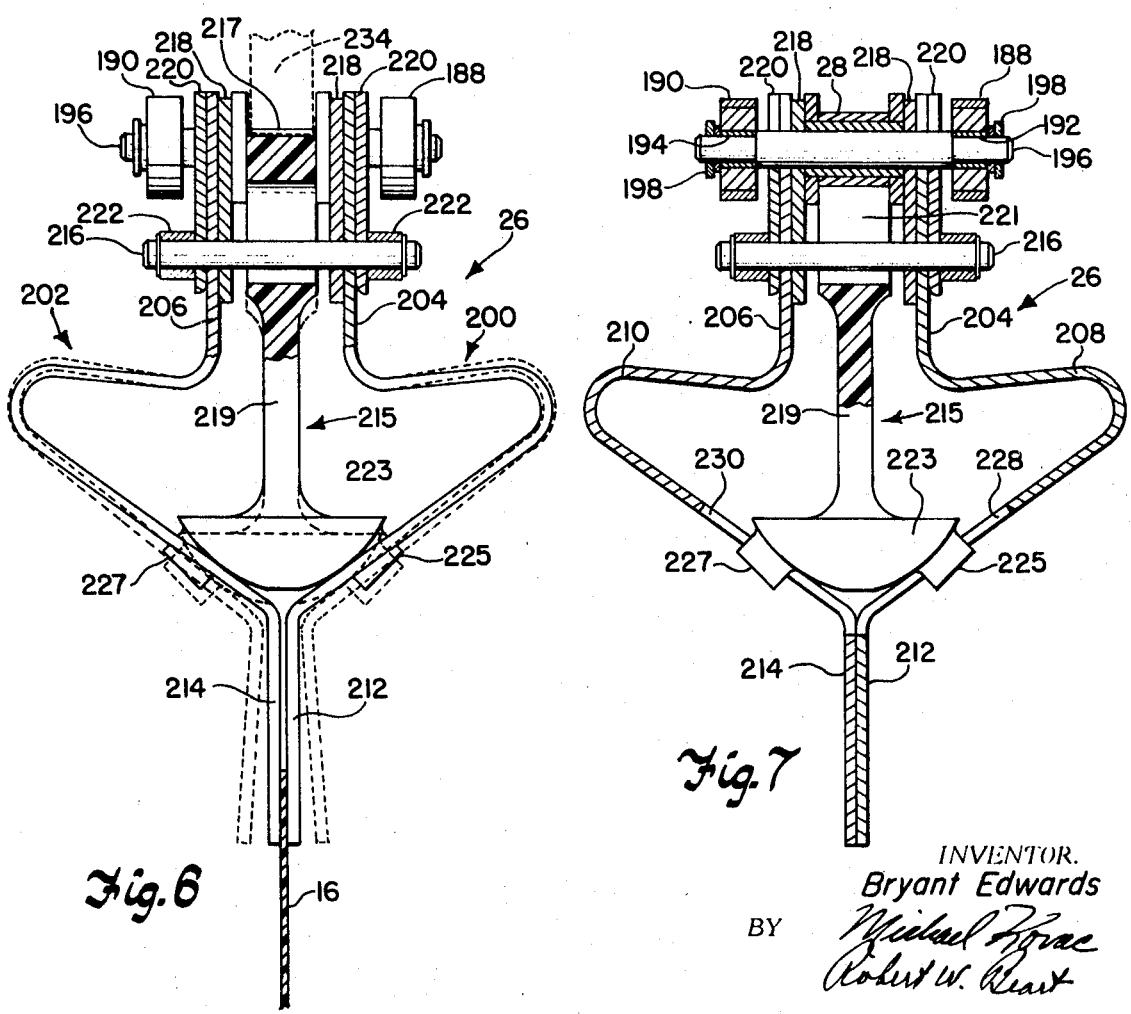

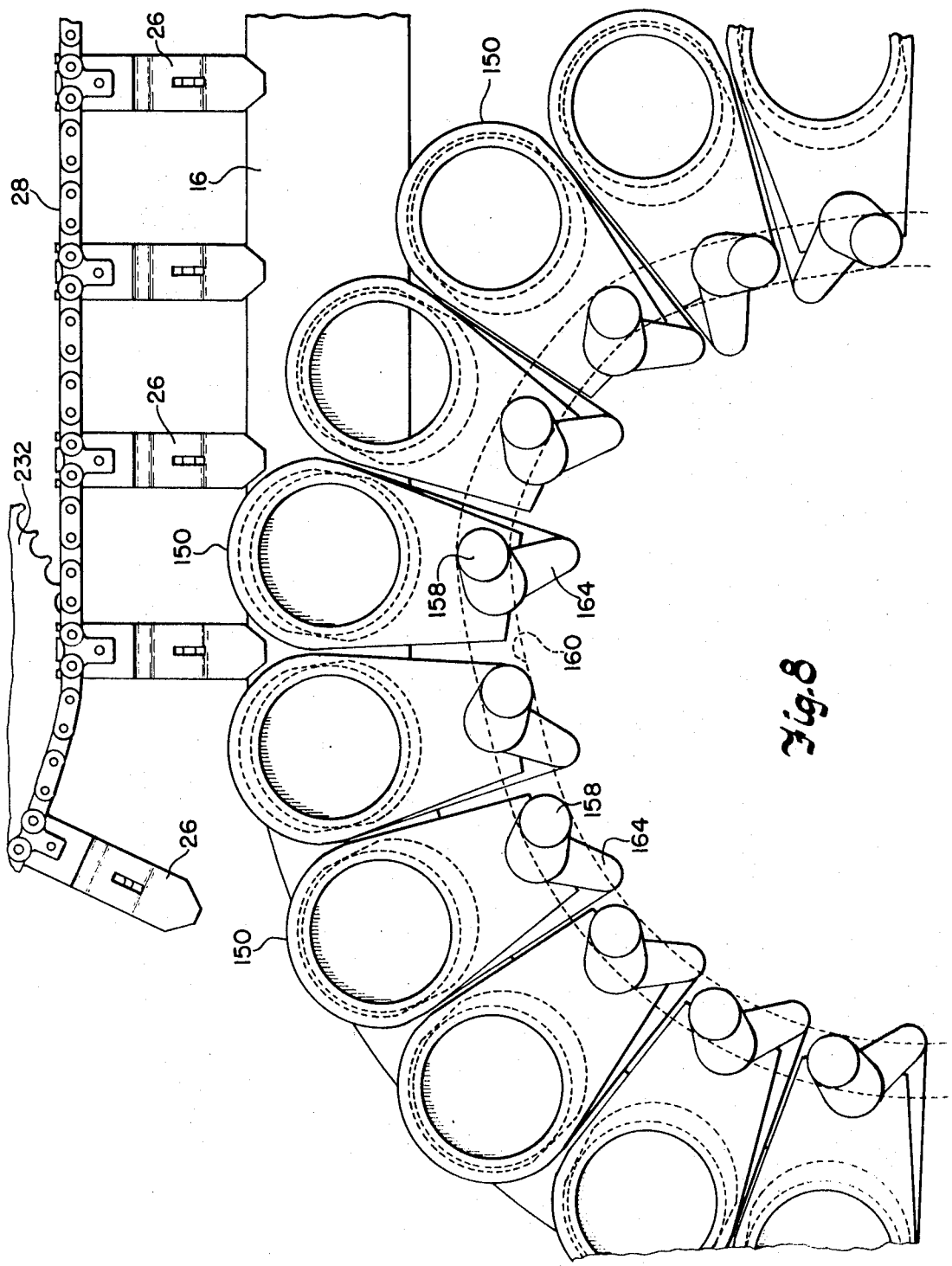

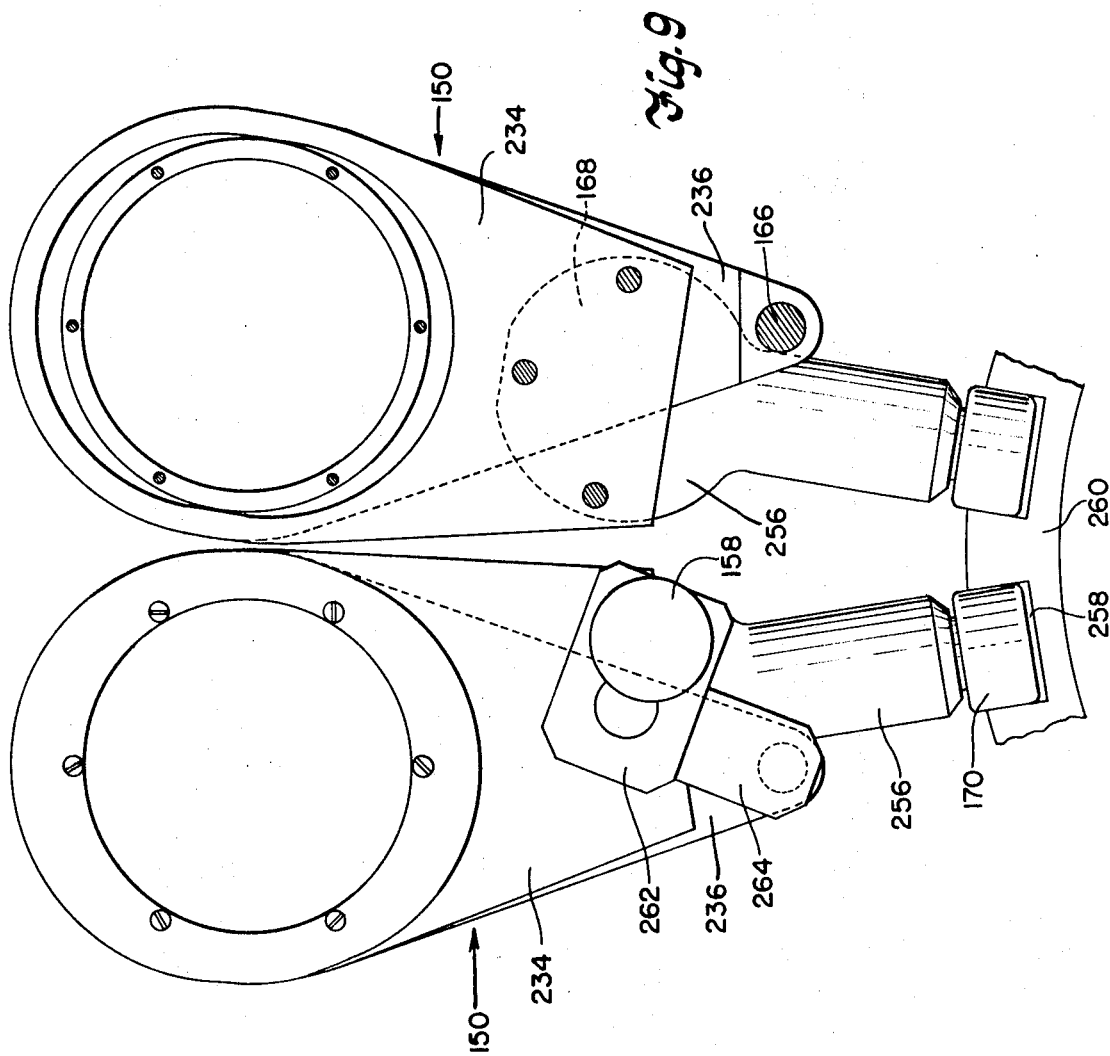

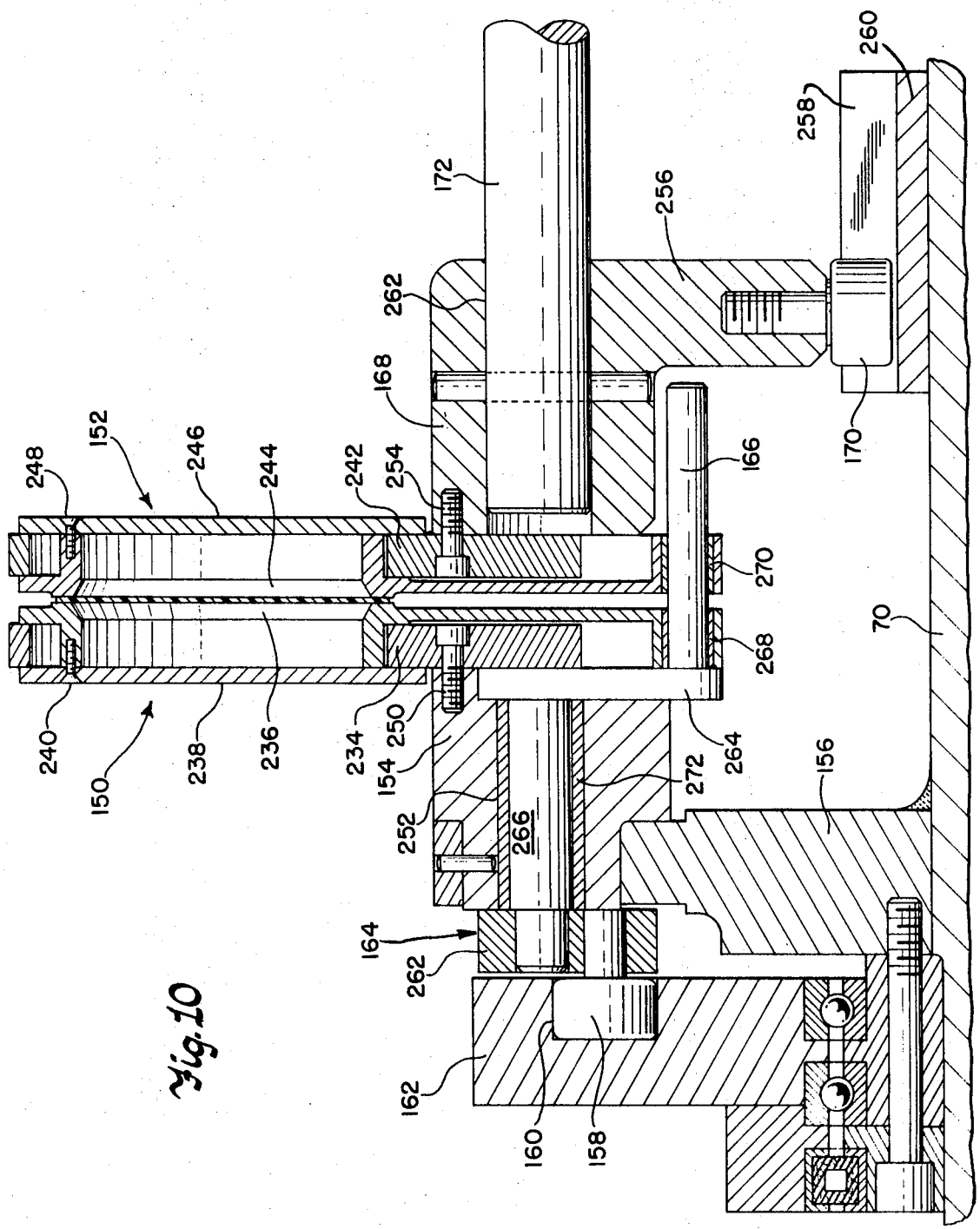

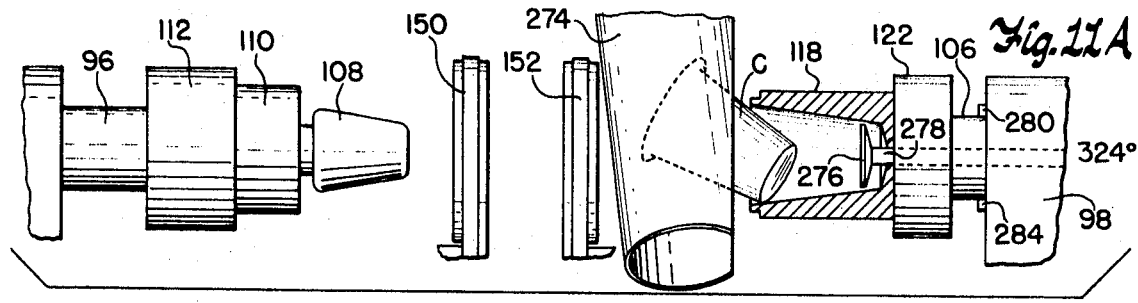
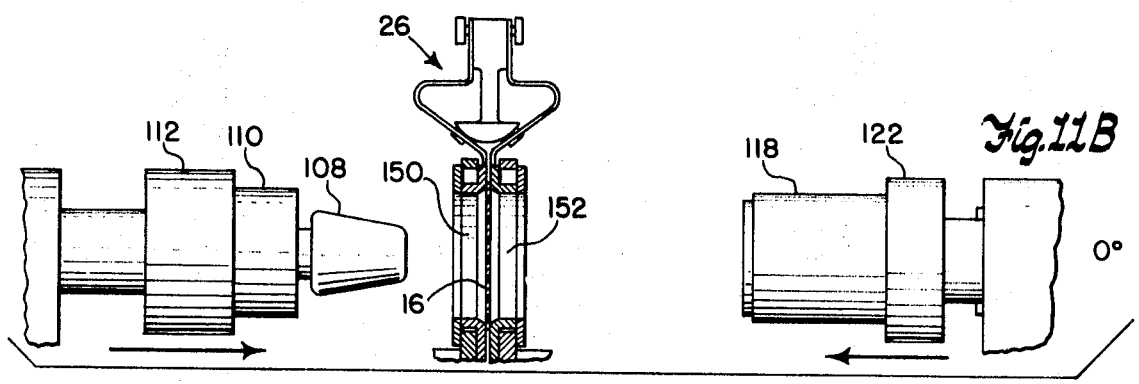
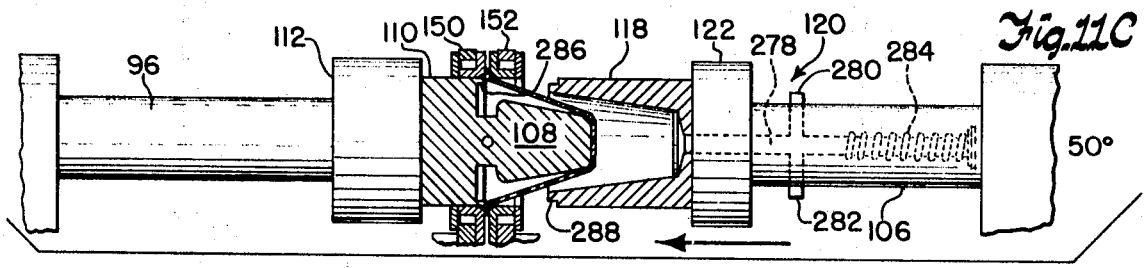
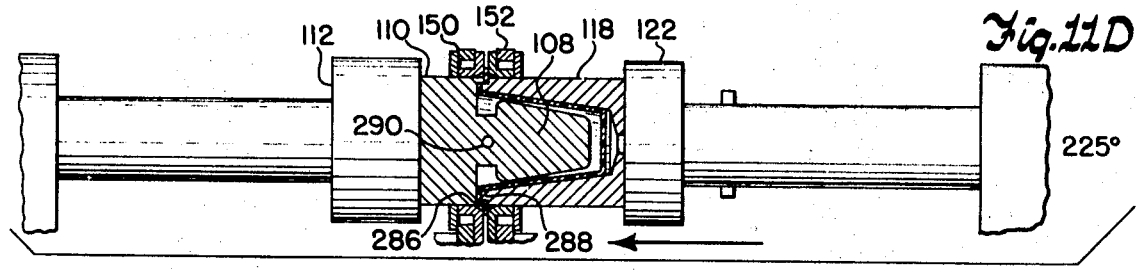
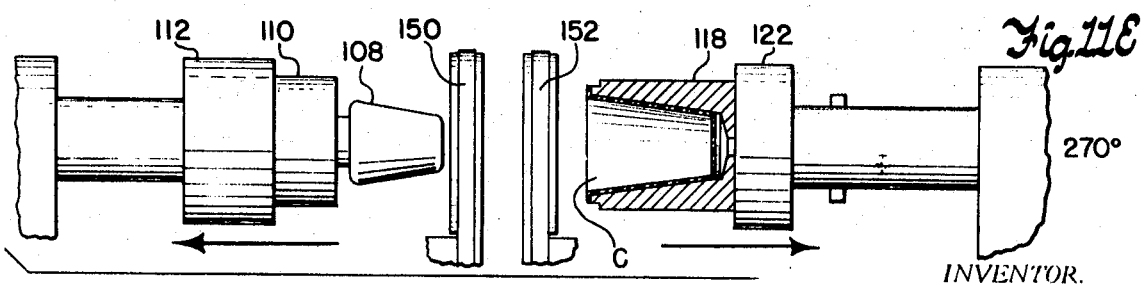

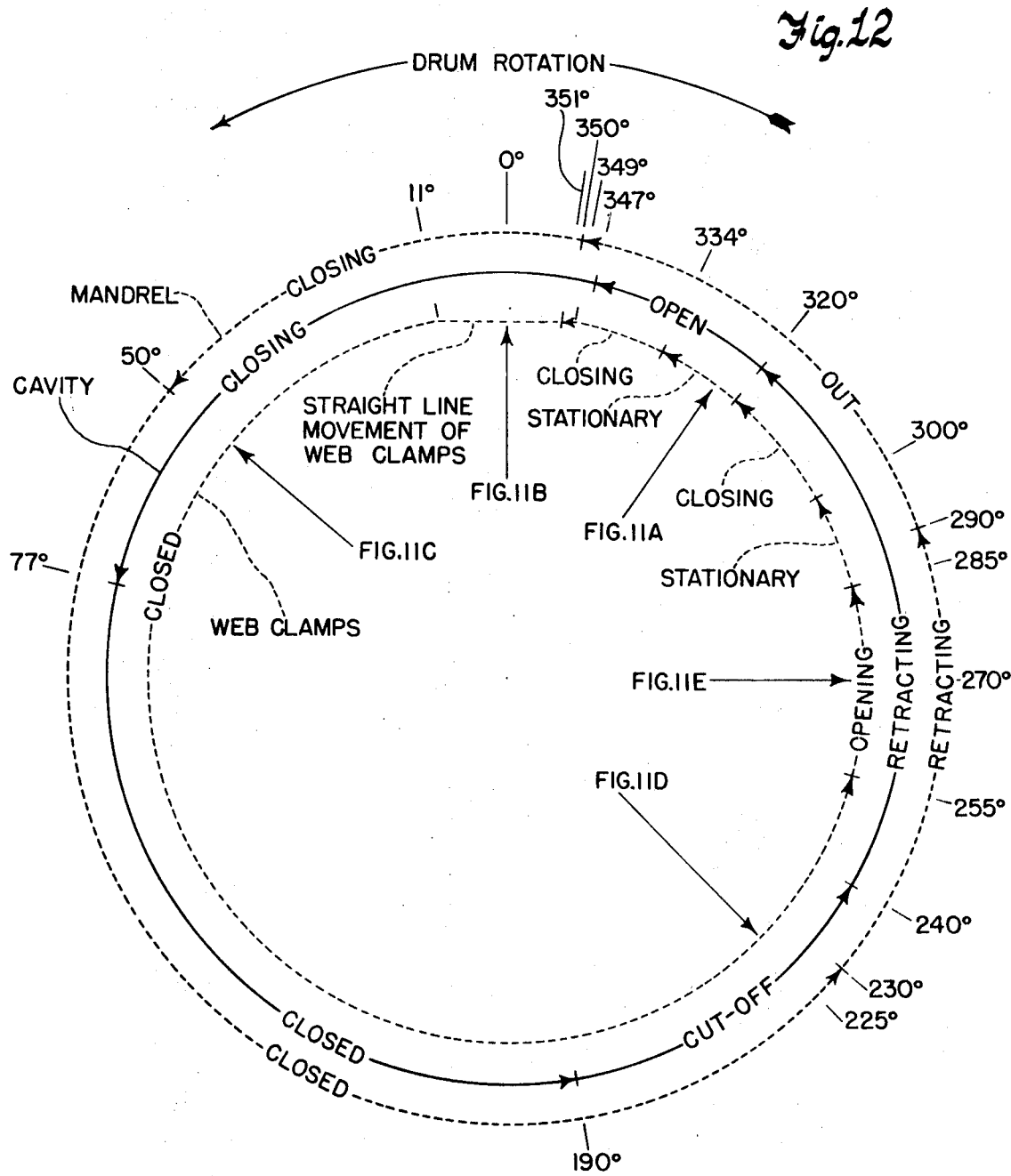

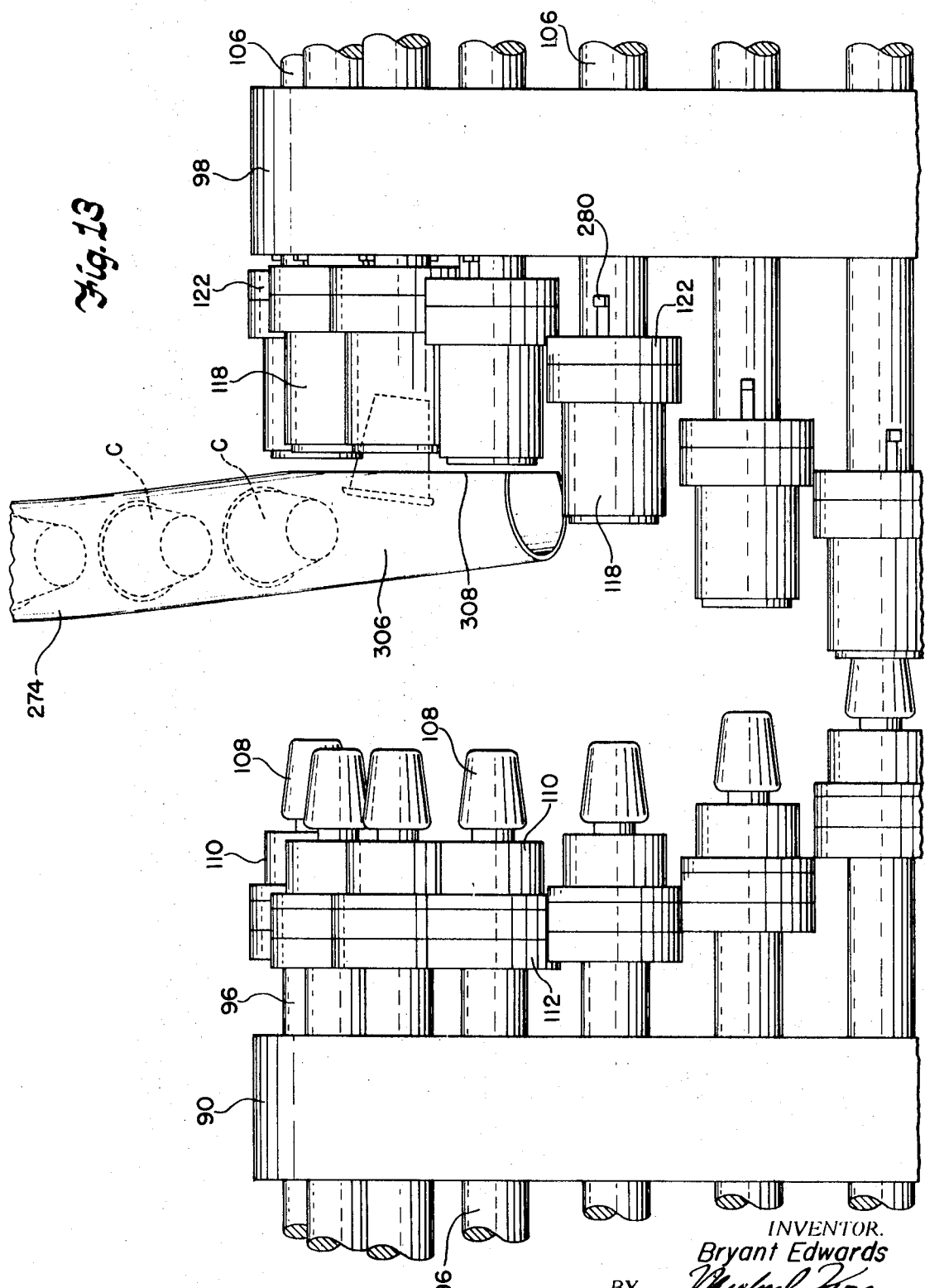

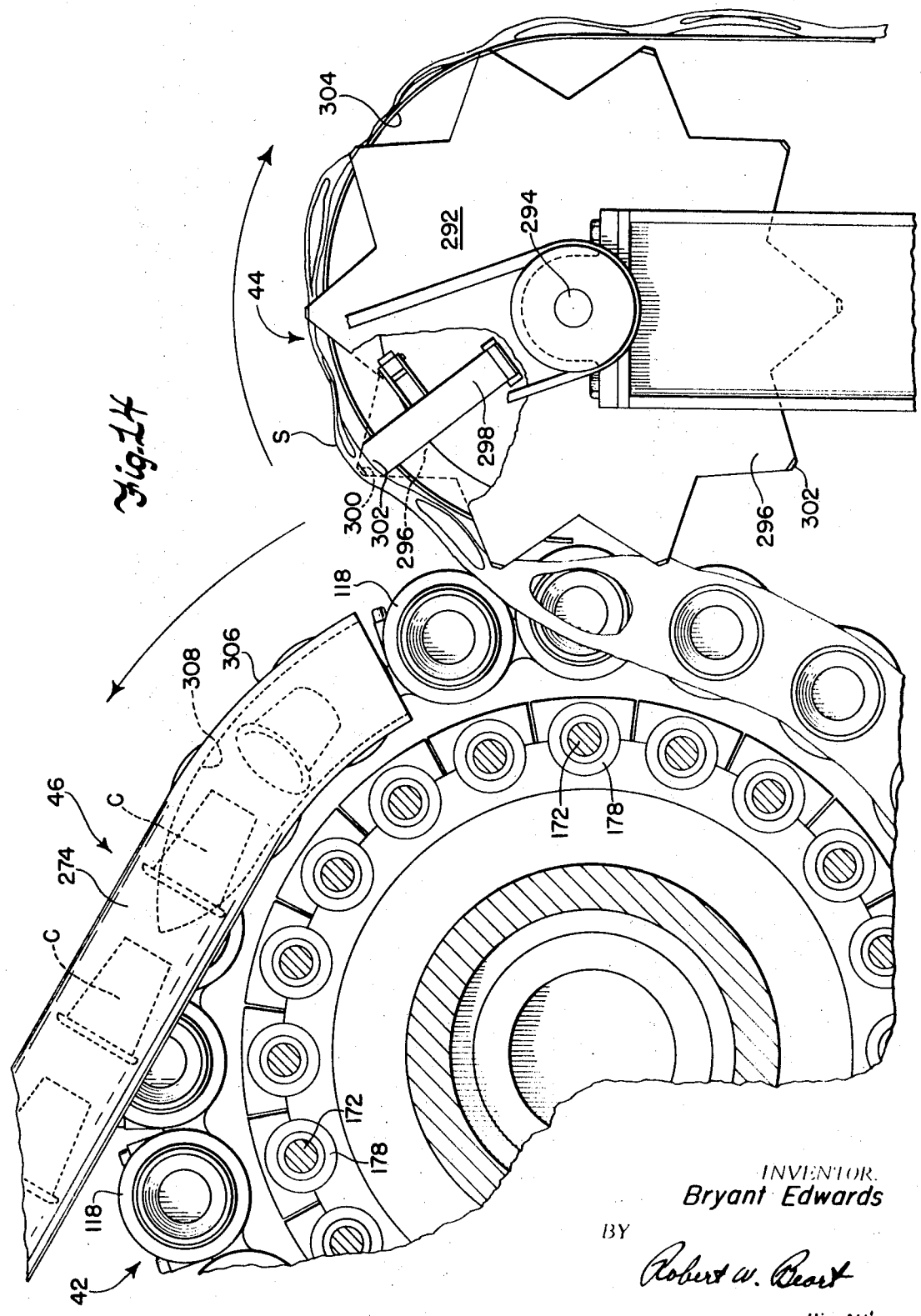

United States Patent Office 3,605,192
Patented Sept. 20, 1971

3,605,192
CONTINUOUS MOTION CONTAINER MOLDING MACHINE
Bryant Edwards, Clarendon Hills, Ill., assignor to Illinois Tool Works Inc., Chicago, Ill.
Filed July 28, 1969, Ser. No. 845,270
Int. Cl. B29c 17/03, 3/04, 7/00
U.S. Cl. 18—19R
27 Claims

ABSTRACT OF THE DISCLOSURE

A continuous motion container molding machine is provided with cooperating molds which operate upon heated thermoplastic sheet or web material to form disposable containers. The heated sheet material web is continuously delivered to the cooperating molds, the transfer therebetween being accomplished by circumferential web clamping means along a coincidental path when synchronized with the speed of the moving web, thereby enabling the cooperating mold means to form thin-wall, substantially uniform-in-thickness, containers from the material clamped off from the remainder of the moving web. Unique substations of the continuous motion container molding machine including sheet delivery, web clamping, scrap removal, and cup ejection substations are also disclosed.

---

Disposable, thin-wall plastic cups and containers for vending or over-the-counter use are being used in increasing numbers as consumers become aware of the many advantages such cups possess over paper cups, whether coated or impregnated with wax or plastic. Some of the more well-known advantages include, among others, the characteristics of being liquid tight, sanitary, taste free, moisture impervious, and vapor inhibiting. Consumers have appreciated these qualities in disposable or expendable containers.

Several techniques have been employed in the fabrication of throw-away or expendable plastic containers. During the early stages of plastic container development, well-known injection molding techniques were adapted to the manufacture of such containers. Fabrication of plastic containers by this method included the injection of hot plastic material under pressure into a confined mold which conformed to the ultimate container configuration. Injection molded containers necessarily possess relatively thick walls which result in containers utilizing more plastic material than was required in order to economically compete with their paper cup counterparts. This factor, coupled with the limiting speeds in producing plastic containers, made this process relatively ineffective from a competitive standpoint.

The inability to produce relatively thin-walled plastic containers in high-volume production by the injection molding process contributed, at least in part, to the development of thermoforming techniques and processes where a heated sheet of thermoplastic material is molded to form container products. This method is best exemplified by the use of positive or negative fluid pressure, with or without mechanical engagement of the heated plastic web to be formed into the desired thin-walled container shape. The speed of this process, together with the relatively thin-walled character of the plastic containers and the many diverse configurations that are possible with this method, has contributed significantly to the impetus of disposable or expendable plastic cups and containers.

As presently known, there are certain limitations in the thermoforming process since it is an intermittent sheet-advance and molding technique. Currently, it is the practice to intermittently feed heated thermoplastic sheet or web material to a molding station where reciprocating molds, positioned on opposite sides of the web, are advanced to form the container product. Heat is a necessary ingredient in the thermoforming process in order to fabricate the desired container configuration, and it has been found that the cooling of the container after formation thereof, in order to eject or remove it from the mold, constitutes a relatively high percentage of the time required to form containers as compared with the other steps in the thermoforming cycle. Additionally, forming cycle time is increased as the result of the dead times involved in the intermittent feeding of the heated sheet to the molding station, the opening and closing of the web clamps and molds, and the ejection or removal of containers from the molds.

There have been some recent proposals which have combined injection molding and thermoforming techniques for the purposes of a faster molding cycle with lower injection pressures than is possible with conventional injection molding methods. Such processes, which have been termed injection blow molding, require the intermittent placement of formed plastic disks of predetermined thickness in intermittently reciprocal molds as in the typical thermoforming process, and therefore, do not avoid the large cooling times and dead-time aspects of the sheet transfer, clamp and mold movement, and cup ejection.

In the present invention a continuous motion container molding machine is disclosed which overcomes, in large measure, the above stated disadvantages of the thermoforming process. Continuous motion plastic bottle machines have been proposed, principally for non-nesting, blow-molded products; but there has been no suggestion that the continuous manufacture of open-mouthed, plastic containers can be adapted to the thermoforming technique.

It is an object of the present invention to provide a continuous motion container molding method and apparatus for the manufacture of open-mouthed, thin-walled containers.

Another object of the present invention is the provision of a method and apparatus of the aforementioned type which overcomes many of the disadvantages inherent in the thermoforming process while retaining all of the advantages thereof.

A further object of the present invention is the provision of a method and apparatus of the type described which incorporates a continuous sheet or web feeding system which rapidly delivers heated sheet or web material to a container molding station at the proper time and location.

Still another object of the present invention is the provision of a method and apparatus which includes a container molding station providing circumferential clamping of the heated sheet or web material along a coincidental path when synchronized with the speed of the sheet or web to provide a defined or predetermined material section which does not include fold lines of varying thickness as is essential for the fabrication of thin-walled plastic containers having uniform wall thickness without weakened or unnecessarily rigid sections.

A still further object of the present invention is the provision of a container molding method and apparatus as aforementioned which provides effective scrap removal, as well as the ejection and removal of formed containers in an oriented fashion for subsequent delivery to a rim rolling station or the like.

The above and other objects and advantages of the present invention are attained by the provision of a continuous molding method or apparatus which includes the steps or means of feeding a heated thermoplastic web to at least one pair of continuously rotating cooperating molds, simultaneously attaching the web to the molds for predetermined coincidental movement therewith and clamping off a predetermined material area from the remainder of the web, and forming containers from the predetermined material area when attached to the cooperating molds.

Reference is now made to the accompanying drawings wherein:

FIG. 1 is a top plan view of the continuous motion container molding machine embodying the principles of this invention;

FIG. 2 is a side elevational view of the apparatus of this invention;

FIG. 3 is an enlarged fragmentary end elevational view depicting the endless container molding station of the invention;

FIG. 4 is an enlarged fragmentary sectional view of the container molding station as viewed along a substantially vertical plane section thereof;

FIG. 5 is an enlarged fragmentary elevational view of the web feeding apparatus as it delivers a heated web of material to the container molding station and is then subsequently disengaged from the web;

FIG. 6 is an enlarged end elevational view of one of the web conveyor clip means associated with the web conveying apparatus of the present invention;

FIG. 7 is an enlarged, partially elevational and sectional view further illustrating one of the web conveyor clip devices;

FIG. 8 is an enlarged fragmentary elevational view illustrating the web conveying apparatus in conjunction with the web clamping means of the container molding station.

FIG. 9 is a further enlarged fragmentary view of the web clamping means attached to the container molding station;

FIG. 10 is also an enlarged elevational and sectional view of the web clamping means mounted on the container molding station;

FIGS. 11A–11E are fragmentary semi-diagrammatic representations of the principal steps in the forming of containers at the container molding station;

FIG. 12 is a timing diagram which shows the relative movement and times, as well as the respective position, of the web clamps and mold and plunger elements in the container molding operation;

FIG. 13 is a fragmentary side elevational view illustrating the opening of the cooperating molds at the end of the forming cycle and the removal of the formed containers from the container molding station; and FIG. 14 is a fragmentary side elevational view of one-half of the container molding station as viewed transverse to the vertical plane extending therebetween and showing the scrap pick-off wheel and cup removal substations of the present invention.

GENERAL DESCRIPTION OF THE MACHINE

As best seen in FIGS. 1-2 of the drawings, the continuous motion container molding machine generally identified by the numeral 10 includes a reel storage station 12 where up to two reels 14 of thermoplastic sheet or web material 16 are mounted for sequential use by the machine 10. A reel loading station 15, where the reels 14 are kept prior to use thereof, forms part of the reel storage station 12. The leading edge of the sheet or web material 16 from any of the reels 14 is delivered to the web take-up and in-feed station 18 where a plurality of web feeding rollers 20 are provided for transferring the web 16 at the desired predetermined speed which is synchronized with the other substations of the machine. Suitable dancer rolls or the like which provide web take-up and web register systems to provide proper positionment of the trailing and leading edges of the webs 16 from any two reels 14 are preferably employed to assure an uninterrupted transfer or delivery of webs 16 to the other substations of the machine 10.

The main web feeding system comprises the endless web conveyor means 22 which is arranged to deliver the web 16 of thermoplastic material from the web take-up and in-feed station 18 through a web heating station 24 to the container molding station 40. The web conveyor means 22 includes a plurality of spaced web conveyor clip devices 26 which are attached to a driven endless chain or belt 28 and arranged to grip the web 16 being fed through the machine 10 along the upper margin thereof. The web conveyor clip means 26 grip the upper margin of the vertically oriented web 16 being fed through the machine adjacent the web take-up and in-feed station 18 for delivering the web 16 therefrom to the container molding station 40. As previously noted, the web 16 is passed through the heating station 24 en route to the container molding station 40, and for this purpose the lower run of the endless chain or belt conveyor 28 carries the web 16 through a series of heater banks 30 positioned along the path of the moving web 16. Each of the heater banks 30, shown in FIG. 2 of the drawings to be four in number, contains vertical calrod units or other suitable heating mechanisms (not shown) which are arranged on opposite sides of the moving web 16 to provide the proper heating environment for the web 16 prior to its being delivered at the suitable heated temperature to the container molding station 40. The calrod or other heating element of each heater bank 30 is preferably mounted in the lower movable section 32 which is mounted for pivotal movement at 34. Air cylinder devices 36 or the like are connected to the lower movable section 32 of the heater banks 30 and are arranged to be actuated by suitable electronic controls to laterally displace the lower movable sections 32 containing the heating elements away from the moving web 16 whenever the machine 10 is stopped. This prevents the heater banks 30 from melting the web 16 in the event that the machine 10 is stopped for one reason or another.

The web or sheet 16, after suitable heating thereof to the prescribed temperature, is then delivered to the container molding station 40 where an endless rotary drum 42 containing web clamping and mold members, as will be discussed in detail below, operate on the web to form substantially uniform - in - thickness, thin-wall, nestable plastic containers from the heated thermoplastic web 16. As will be apparent from the description that is to follow, all of the web 16 is not utilized in the fabrication of the plastic containers; therefore, a scrap removal means 44 is provided for carrying away the web scrap to a granulator mechanism (not shown). The containers which are formed are removed from the continuously rotating drum 42 by the pneumatic container removing tube 46 which delivers the formed containers in oriented fashion to a rim rolling station (not shown) where the cups are rim rolled and then transferred to a cup removal station where the formed plastic containers are packed for shipment to the ultimate consumer.

It is within the contemplation of the present invention that formed plastic disks can be delivered by suitable conveying mechanisms to the container molding station where the continuous forming of plastic containers according to the injection blow-molding technique can be performed. In the preferred form of the invention, a web of thermoplastic material 16 is utilized, and in the discussion that is to follow specific description will be given regarding this preferred embodiment of the invention.

CONTAINER MOLDING STATION

In order to understand the functioning and operation of the various substations of the machine 10, it will be helpful to first have in mind the structure and operation of the container molding station 40. This station is best illustrated in FIGS. 3-4 of the drawings. The container molding station 40 includes upright, generally opposed frame elements 48, 49 which are interconnected by upper and lower supporting beams 50. The motor 52 is mounted at one side of the container molding station as seen in FIG. 1 and drives an endless belt 54 which is entrained about motor guide pulley 56 and frame supported guide pulley 58, the latter in turn driving the upper spur gear 60 which meshes in toothed engagement with the lower spur gear 62, as seen in FIG. 4 of the drawings, for driving or rotating the shaft 64 upon which the rotary drum 42 is mounted. It will be appreciated that the guide pulley 58 and the upper spur gear 60 are suitably journaled on a frame supported shaft 63 while the lower spur gear 62 is fixedly mounted in an external fashion about the rotary drum shaft 64 at one end thereof as best seen in FIG. 4 of the drawings.

The rotary drum shaft 64 is illustrated in FIG. 4 as comprising a three-piece shaft having hollow, relatively smaller shaft sections 66, 68 at opposite ends thereof which are supported by the frame elements of the machine, and a hollow, relatively larger intermediate shaft section 70 which supports the web clamps and cooperating molds. The hollow three-piece rotary drum shaft 64 is utilized for carrying cooling tubes or the like which are connected to the cooperating molds for cooling the container product after forming thereof.

The relatively smaller, hollow shaft sections 66, 68 are supported at the outermost ends thereof by tapered roller-bearing assemblies 72, 74 respectively which are, in turn, supported by the upright, vertical frame elements 48, 49 respectively at opposite ends of the container molding station 40. The innermost portions of each of the relatively smaller, hollow shaft sections 66, 68 are mounted within complementary configured openings at opposite ends of the relatively larger, hollow shaft section 70.

The intermediate rotary drum shaft section 70 fixedly mounts, at opposite ends thereof, cylindrical mandrel and mold cavity supporting platens 76, 78 respectively. The mandrel and mold supporting platens 76, 78 are provided with central openings 80, 82 respectively, which are complementary configured relative to the external configuration and dimension of the intermediate shaft section 70, and may be either frictionally locked together or have means for restraining either rotary of lateral movement of the mandrel and mold supporting platens 76, 78 relative to the intermediate shaft section 70. Toward this latter end, it will be noted that the mandrel and mold supporting platens 76, 78 respectively include, adjacent the central openings 80, 82 thereof, inwardly extending flanges 84, 86 respectively which aid in preventing movement of the mandrel and mold supporting platens 76, 78 toward one another.

Each of the mandrel and mold supporting platens 76, 78 at the outermost periphery thereof include axially aligned, spaced journal supports with associated bushing elements. Specifically, the mandrel supporting platen 76 includes axially spaced journal supporting sections 88, 90 into which are mounted associated bushings 92, 94 respectively for reciprocally mounting the mandrel shaft 96. In the case of the mold supporting platen 78, the axially spaced journal supports 98, 100 include associated bushings 102, 104 which reciprocally mount the mold shafts 106.

The manner in which the mandrel and mold shafts 96, 106 respectively carry the cooperating mold elements and move with respect to one another is best seen by comparing the elevational and sectional views of the rotary drum 42 illustrated in FIGS. 3–4 of the drawings. Considering first the mandrel shaft 96, it will be noted that the innermost or forward end thereof includes a mandrel or plug 108, a mandrel block 110 including cutting elements as will be described, and a mandrel supporting block 112. At the rear or outermost end of the mandrel shaft 96, there is provided a rear shaft guide block 114 and a cam follower 116 on opposite sides thereof. In the case of the mold cavity shaft 106, the forward or innermost end thereof includes the mold cavity 118 having associated therewith cutting elements complementary to those carried by the mandrel block 110, a container ejector or knock-out plug mechanism 120 and a mold cavity supporting block 122. The rear or outermost end of the mold cavity shaft 106 has associated therewith at opposite sides thereof a rear mold cavity shaft guide block 124 and a cam follower 126.

During the forward and rearward movement of the mandrel and mold cavity shafts 96, 106, the axially spaced journal supporting sections 88, 90 in the case of the mandrel shafts 96 and the axially spaced journal supporting sections 98, 100 associated with the mold cavity shafts 106 assure essentially linear movement of the cooperating mandrels and mold cavities 108, 118 respectively and associated parts thereof. The rear mandrel and mold cavity shaft guide blocks 114, 124 respectively include complementary surfaces or interfitting portions on adjacents shaft guide blocks to prevent any rotary movement of the shafts 96, 106 during the rotary movement of the rotary drum station 42. In this way, the cooperating mandrels and mold cavities 108, 118 respectively will move toward and away from one another without any adverse influence from centrifugal forces during the rotation of the rotary drum station 42.

Reciprocating movement of the mandrel and mold cavity shafts 96, 106 is achieved by the movement of the cam followers 116, 126 in a cam slot or track. For this purpose, there is provided a mandrel barrel cam 128 having a cam slot or track 130 in which the cam followers 116 of each mandrel shaft 96 ride. A mold cavity barrel cam 132 is also provided and has formed therein a cam slot or track 134 in which the cam followers 126 of the mold cavity shafts 106 ride. The mold cavity barrel cam 132 further includes a cam slot or track in which guide followers of the web clamp mechanism ride as will be presently described.

The mold cavity barrel cam 132 is fixedly mounted to the upright frame support 49 at the right-hand side of the machine as viewed in FIG. 4 of the drawings. The mandrel barrel cam 128 is also fixedly mounted relative to the rotary drum shaft 64, but permits limited lateral movement of the cam, together with the mandrel shafts 96 in the event of web jam-up or other such occurrence. In this regard, it will be noted that the mandrel barrel cam 128 is non-rotatively supported relative to the frame element 48 at the left-hand side of the rotary drum station 42 in FIG. 4 of the drawings by a plurality of fixed shafts 138 which are journaled in the frame element 48. Each of the shafts 138 includes spaced bearing-bushing assemblies 142, 144 respectively supporting the rotary fixed shafts 138 for limited lateral movement between the enlarged head 148 at the free end of the shafts 138 and the innermost face or surface of the upstanding frame support 48. An annular support member 148 couples the shafts 138 and bearing-bushing assemblies 142, 144 to one another to provide circumferential support for the mandrel barrel cam 128. In order to provide the limited lateral movement of the mandrel barrel cam 128 along the shafts 138, means (not shown) preferably coupled to the circuit of the machine is provided to laterally displace the mandrel barrel cam 128 in the event of web jam-up or other similar occurrence.

In order to achieve the fabrication of substantially uniform-in-thickness, thin-wall plastic containers with no weakened or unnecessarily thickened portions, it is necessary that a predetermined material section of the web 16 to be clamped on opposite sides thereof prior to engagement by the cooperating molds. The specific manner in which the clamps operate in a continuous motion machine will be described in detail below, but it is important to understand the environmental setting in which the clamps are mounted on the rotary drum station 42. This can be best understood by again referring to FIG. 4 of the drawings which shows generally opposed pairs of circumferential web clamping means 150, 152 intermediate the mandrel and mold cavity 108, 118 respectively. The circumferential web clamping means 150, 152 are designed to clamp a predetermined material section of the web 16 in a circumferential manner about the peripheries of the mandrel and mold cavity 108, 118 respectively to permit these cooperating molds to operate upon the predetermined material section in a manner to be described.

The web clamp 150 is supported by the web supporting block 154 which, in turn, is supported by the upstanding external flange 156 integrally connected to the intermediate shaft section 70 of the rotary drum shaft 64. In order to permit rotary and angular adjustment of the web clamps 150, 152 as will be described below, a cam follower 158 which rides in the cam slot 160 of the face cam 162 is connected to a bell-crank mechanism 164, partially shown in FIG. 4 of the drawings which will be more specifically described in connection with FIGS. 8–10 of the drawings. Controlled angular and rotary movement of the web clamp 152, along with the web clamp 150, is achieved by the common shaft 166 at one end of the bell-crank mechanism 164.

Web clamp 152 is vertically supported by the intermediate shaft section 70 by way of the web supporting block 168 and the web guide roller 170 which rides in a guide slot 258 in ring guide slot member 260 which is generally parallel with the axis of the rotary drum shaft 64.

Each web clamp 152 is reciprocated relative to the web clamp 150 by way of the shaft 172 which is connected at one end to the web supporting block 168 and at the other end is provided with a cam follower 174 which is guided in the cam slot or track 136 formed in the mold cavity barrel cam 132. The shaft 172 is journaled adjacent the cam follower end in a bushing 176 and adjacent the other end is supported in a bushing-bearing assembly 178, in turn, supported by an externally projecting integral flange 180 of the intermediate shaft section 70. Each mold clamp 152 is normally biased in a clamped position relative to the mold clamp 150 as the result of the helical coil spring 182 which is maintained in a compressed state by the spring clamping plates 184, 186, thereby urging the shaft 172 and its associated web clamp 152 into clamped arrangement with its respective web clamp 150. As the cam follower 174 follows the cam slot 136, the helical coil spring is further compressed, thereby opening up the web clamps 150, 152 as can perhaps be best seen when considering FIGS. 3–4 of the drawings in conjunction with one another.

With the understanding of the structure and operation of the container molding station in mind, it will be easier to understand the cooperation of the various substations of the machine 10 beginning with the web delivery and concluding with the scrap removal and cup ejection.

WEB FEEDING SYSTEM

In FIGS. 2 and 5–7, a web feeding system comprising an endless web conveyor means 22 is shown. The endless web conveyor means 22 operates between the web take-up and in-feed station 18 through the web heating station 24 to the container molding station 40. In general the web conveyor means 22 includes a plurality of spaced, web conveyor clip devices 26 which are attached to a driven, endless chain 28. Each of the web conveyor clips 26 are designed to engage the web 16, as best seen in FIGS. 5 and 8 of the drawings, along limited upper marginal areas of the vertically oriented web 16 in a manner so as not to interfere with the circumferential web clamping means 150, 152 of the endless rotary drum 42.

Each of the web conveyor clip means 26 is provided with a pair of free rotating rollers 188, 190 which are mounted on opposite sides of the endless chain 28. Each pair of rollers 188, 190 are mounted in a closed, endless track (not shown) to prevent sagging of the endless chain belt 28. The opposed pairs of rollers 188, 190 are mounted in the plane of the endless chain belt 28 and are supported on bushings 192, 194 which are mounted at opposite ends of the shafts 196. Fastening means in the form of a C-retaining ring 198 or the like prevents lateral movement and disassembly of the rollers 188, 190 relative to the shafts 196. As best seen in FIG. 7 of the drawings, the shafts 196 extend through the endless chain 28, and thus are carried thereby along with the associated pairs of rollers 188, 190.

For clamping the web 16 along the upper margin thereof, a pair of spring biased clamping elements 200, 202 are provided. The clamping elements 200, 202 are configured and mounted relative to the endless chain 28 to provide upper sections 204, 206 respectively which are generally parallel to each other, middle body sections 208, 210 respectively which generally have a sear-spring shape, and a pair of lower sections 212, 214 which function to clamp the web 16 as will be presently described. The upper body sections 204, 206 of the clamping elements 200, 202 respectively have suitably aligned upper and lower openings for receiving the pairs of shafts 196 and the single lower shaft 216. Two pairs of retaining plates 218, 220 are mounted on the pair of shafts 196 and shaft 216 on opposite sides of the upper sections 204, 206 respectively of the clamping elements 200, 202. Nuts 222 threadably associated with the shaft 216 engage the outer plate of each of the pairs of retaining plates 218, 220 and clamp the upper sections 204, 206 against the inner plates of the pairs of retaining plates 218, 220, the inner plate in each pair of retaining plates 218, 220, in turn, being supported by the endless chain 28 along outer faces thereof as indicated in FIGS. 6–7 of the drawings. This provides a stable and secure mounting for each clamping element 200, 202 relative to the endless chain 28.

The clamping elements 200, 202, when mounted to the endless chain 28 in the manner just described, enable the sear-spring spaced middle body sections 208, 210 respectively to maintain the lower clamping sections 212, 214 in a closed position as best illustrated in FIG. 7 of the drawings. Thus, the clamping elements 200, 202 are normally spring biased to a closed position to assure gripping of the web 16 for the unimpeded delivery thereof to the various substations of the machine 10.

In order to open the lower clamping sections 212, 214 of the clamping plates 200, 202 respectively to permit the engagement and disengagement with respect to a web 16, there is provided a plunger element 215 associated with each web conveyor clip means 26. Each plunger element 215 includes a head portion 217 and an elongated shank 219 having a vertical slot 221 therein for mounting the plunger 215 relative to the shaft 216 while permitting limited vertical movement thereof, and an enlarged foot section 223 with integral wing elements 225, 227 which are mounted in longitudinal openings 228, 230 of the sear-spring shaped middle body sections 208, 210. The limited vertical movement of each plunger 215, permitted by the vertical slot 221, is complemented by the spherical shape on the lower face of the enlarged foot section 223 which, when the plunger 215 is depressed, moves the downwardly and inwardly tapering portions of the middle body sections 208, 210 apart from one another to open up the clamping sections 212, 214 as is illustrated in FIG. 6 of the drawings. The wing elements 225, 227 move within the longitudinal openings 228, 230 when this occurs, thereby assuring stability to the plunger element 215 during its movement. Upward movement of a plunger element 215 will then cause the sear-spring shaped middle body section 208, 210 to move the clamping sections 212, 214 respectively to their normally clamped or closed position. The plunger elements 215 are depressed adjacent the web take-up and in-feed station 18 in order to permit the web conveyor clips 26 to grip the web 16 adjacent the upper margin thereof and also after the web 16 has been clamped to the rotary drum 42 by the opposed circumferential web clamping means 150, 152. While any suitable means may be employed for this purpose, it has been found that a sprocket wheel 232 with a specially configured tooth formation 234 is very effective in engaging the heads 217 of the plunger elements 215 and depressing them at the desired moment.

WEB CLAMPING MECHANISM

The web conveyor clips 26 are disengaged from the web 16 in sequential fashion as the circumferential web clamping means 150, 152 are sequentially attached to the web 16. The transfer of the web 16 from the web conveyor clips 26 to the circumferential web clamping means 150, 152 is an important part of the continuous motion molding operation for a number of reasons. The web 16 follows a vertically oriented, linear path while being fed by the web conveyor clip means 26, and after clamping by the circumferential web clamping means 150, 152 is then caused to move in a predetermined arcuate path about the rotary drum 42. This necessitates the clamping of the web by the circumferential web clamping means 150, 152 along a coincidental path when synchronized with the speed of the web in order to assure predetermined, simultaneous movement of the web 16 and web clamping means 150, 152 along a predetermined path. Failing to clamp the web 16 in the manner just described as it is converted from linear to arcuate movement will cause undesirable stretching and fold lines in the web which will result in unnecessarily thin or thickened sections in the ultimately formed container. These difficulties can be avoided by clamping off a predetermined material area of the web 16 by the circumferential web clamping means 150, 152 before the web 16 begins its arcuate movement, thereby segregating selected web areas which can be operated upon by the cooperating mold to form containers. Any stretching or material folding outside of the circumferentially clamped areas does not interfere with the molding operation or create undesired thinned or thickened sections in the container that is formed.

The structural components of the web clamping means and its operation can best be understood by reference to FIGS. 8–10 of the drawings. In FIG. 8 of the drawings the movement of the adjacent pairs of web clamps 150, 152 through a circumferential path, including both arcuate and linear movement of the web clamps 150, 152 during rotation thereof is illustrated. The web clamps 150, 152 are mounted on the rotary drum 42 as illustrated in FIG. 4 of the drawings, such that the web clamps will be rotated in the general vicinity of the moving web 16. When the web clamps 150, 152 are synchronized with the speed of the moving web 16, means are employed to assure coincidental movement of the web clamps 150, 152 along a linear path coinciding with the moving web in order to permit clamping of the web 16 by the web clamps 150, 152 when they are traveling in the same path at the same speed. In general, the means employed to assure coincidental, synchronized movement of the web clamps 150, 152 and the moving web 16 comprises a cam follower 158 for each web clamp means 150, 152 which rides in a cam slot 160 of the face cam 162 which is fixedly mounted relative to the base of the machine by a clamp connected between the face cam 162 and the supporting beam 50 as can be seen in FIG. 4 of the drawings. The face cam 162 is rotatively supported on the intermediate shaft section 70 as can be seen in FIG. 10. Each cam follower 158 is attached to a bell-crank mechanism 164, to be presently described, which provides rotational and angular adjustment of each pair of web clamps 150, 152 in order that it may assume a coincidental path synchronized with the speed of the web 16 prior to clamping thereof. The shape of the cam slot 160, together with the relative position of the cam follower 158 and its associated bell-crank mechanism 164 for pairs of web clamps 150, 152 at different relative circumferential positions about the rotary drum 42, can be best seen in FIG. 8 of the drawings.

Referring now to FIG. 10 of the drawings, it will be seen that each web clamping mechanism comprises a pair of generally opposed, circumferential web clamping elements 150, 152 which cooperate together to clamp off a predetermined material area of the web 16 as discussed above. Web clamp 150 includes a clamp ring holder 234 which supports the movable clamping ring 236, the latter, in turn, having a retaining ring 238 which is attached thereto by the fastening means 240 to prevent any horizontal movement of the clamp ring 236. Similarly, the web clamp 152 includes a clamp ring holder 242 which supports the clamping ring 244 with the clamping ring 244 being attached to the retaining ring 246 by the fastening means 248 to restrict horizontal movement of the clamp ring 244 relative to the clamp ring holder 242.

Clamp ring holder 234 is attached, by the fastening means 250, to the web clamp supporting block 154 which, in turn, is supported by the external flange 156 of the intermediate shaft section 70 forming part of the rotary drum shaft 64. The web clamp supporting block 154 includes a transverse opening for receiving part of the bell-crank mechanism 164 as will presently be described.

The clamp ring holder 242 of clamp ring 152 is attached, by way of the fastening means 254, to the web clamp supporting block 168 which includes a depending leg 256 attached to a guide roller 170 riding in a guide slot 258 which is generally parallel with the axis of the rotary drum shaft 64 as can be understood by comparing FIGS. 9–10 of the drawings. Each guide slot 258 is formed in a ring guide slot member 260 attached to the intermediate shaft section portion 70 of the rotary drum shaft 64. The web clamp supporting block 168 is also provided with a transverse opening as is the case with the web supporting block 154 supporting the clamp ring 150, but in the case of the web clamp supporting block 168, the transverse aperture or opening 262 thereof receives a shaft 172 which is retained therein by suitable means. As pointed out in connection with FIG. 4 of the drawings, shaft 172 is connected to a cam follower 174 which is guided in the cam slot or track 136 provided in the mold cavity barrel cam 132 and controls the reciprocating movement of the mold clamp 152 from a normally closed position in clamping engagement with the web 16 to a position where the web clamps 150, 152 are separated from one another.

The bell-crank mechanism 164 includes a first arm 262 which is attached to the cam follower 158, a second arm 264 laterally spaced therefrom and offset at a 90° angle relative to the first arm 262, a connecting shaft 266 which connects the first and second arms 262, 264 of the bell crank, and a shaft 166 common to both of the web clamps 150, 152 and journaled in bushings 268, 270 of the web clamps 150, 152 respectively adjacent the lower ends thereof. Connecting shaft 266 extends through the opening 252 in the web supporting block 154 and is mounted within the bushing 272 for limited rotational movement thereof. Shaft 166, common to both web clamps 150, 152, provides relative sliding movement therealong as well as providing limited rotational movement of the clamp rings 236, 244 along the lower end thereof.

It will be apparent, when comparing FIGS. 8 and 10, that each cam follower 158 as it moves along the cam slot or track 160 moves the first bell-crank arm 262 in different angular positions, and since the second bell-crank arm 264 is connected thereto by the shaft 266 at a 90° offset position relative to the first crank arm 262, the second bell-crank arm 264 will be moved in different angular positions 90° out of phase with the different angular positions of the first bell-crank arm 262. The various angular positions of the second bell-crank arm 264 will be transmitted through the common shaft 166, thereby causing both vertical and angular movement of the web clamps 150, 152 as each cam follower 158 thereof is moved in the cam slot 160.

The web clamp mechanism for each pair of web clamps 150, 152, in addition to providing angular and rotational movement thereof relative to the moving web 16 in order to assume a coincidental path synchronized with the speed of the web prior to the clamping thereof, also provides circular movement of the web clamps 150, 152 in a predetermined arcuate path during the container forming operation. The web clamping mechanism also is designed for low inertia and wear to enable operation thereof at high speeds.

GENERAL OPERATION OF THE MACHINE

Reference to FIGS. 11A–11E which illustrate the principal steps of the container molding operation, together with the timing diagram of FIG. 12 depicting the relative positions of the web clamps, mandrel and mold cavity throughout a 360° machine cycle, will provide an insight into the general operation of the machine. FIG. 12 of the drawings also provides a cross reference to FIGS. 11A–11E by indicating the approximate portion of the mold cycle where the various FIGS. 11A–11E representations take place.

With the rotary drum 42 rotating as indicated in FIG. 12 of the drawings, the first step in the container molding operation is illustrated by FIG. 11A where the web clamps 150, 152 are depicted separated from one another. From the illustrated position, the web clamps 150, 152 will begin to close as an incident to the ultimate clamping of the web 16 at a later portion of the machine cycle. The cooperating mandrel 108 and mold cavity 118 are at their maximum separated distance from one another as a concluding phase to the previous container molding operation so as to permit ejection and removal of the thin-wall, plastic container C, which is drawn by vacuum into the pneumatic tube 274 as will be described more in detail below. Ejection of the container C from the female mold cavity 118 is accomplished by the ejector or knock-out plug mechanism 120 which includes an enlarged head section 276 received within a recess in the bottom of the mold cavity 118. The enlarged head 276 of the knock-out plug mechanism 120 further includes a depending, elongated shank 278 having generally opposed, integral lug elements 280, 282 which are disposed in a slot formed in the shaft 106. Helical coil spring 284 normally biases the knock-out plug mechanism toward the mold cavity 118 such that it forms the bottom wall of the mold cavity during the molding of a container, and upon the relative separation of the mandrel and mold cavity 108, 118, respectively as illustrated in FIG. 11A of the drawings, the integral lug elements 280, 282 engage the journal support 98 of the mold cavity supporting platen 78, thereby providing upward movement of the knock-out plug mechanism causing ejection of the container C as illustrated in FIG. 11A of the drawings.

The beginning of one molding cycle and the conclusion of the previous one is somewhat intertwined in that the web clamps 150, 152 begin to close at approximately 300° of a mold cycle where both the mandrel and mold cavity 108, 118 respectively continue to retract in order to permit ejection and removal of the container C from the mold cavity 118 as depicted in FIG. 11A. This merging of the beginning and concluding phases of sequential mold cycles produces an overall shorter mold cycle time.

As the web clamps 150, 152 are closing, the heated web 16 of thermoplastic material is being carried to the rotary drum 42 by the web conveyor clips 26. As has been previously discussed in connection with FIGS. 8–10 of the drawings, the web clamps 150, 152 are being angularly and rotationally adjusted as they approach the moving web 16 in order to assume a coincidental path synchronized with the speed of the web prior to the clamping thereof. The clamping of the web 16 occurs at approximately 9° before top dead center in the timing diagram of FIG. 12, and this position is represented by FIG. 11B in the drawings. The web conveyor clip 26 is released or disengaged from the moving web 16 after the web clamps 150, 152 engage and clamp off a predetermined material area of the web. When clamped by the web clamps 150, 152, the moving web 16 is attached to the rotary drum 42 thereby causing the web 16 to move in a predetermined arcuate path as perhaps can best be seen in FIG. 8 of the drawings. As the web 16 is clamped by the web clamps 150, 152, the mandrel and mold cavity 108, 118 respectively are being moved relatively toward each other by their respective barrel cam/cam follower arrangements previously described.

The next stage of the molding cycle is represented by FIG. 11C of the drawings wherein the predetermined clamped-off material area of the web 16 is being mechanically engaged by the mandrel 108 as the mandrel 108 and mold cavity 118 are moved relatively toward one another. The mechanical assist phase of the molding cycle as is represented in FIG. 11C of the drawings is taken at approximately 50° of the mold cycle shown in the time diagram of FIG. 12. It is, of course, well known in the art that the mechanical assist pre-drawing of a heated thermoplastic web greatly facilitates distribution of the material in the ultimately formed container. It will be noted that the mandrel 108 and mold cavity 118 have not been closed relative to one another during this pre-drawing phase of the molding cycle.

FIG. 11D of the drawings shows the molds after expansion of the container by air pressure and also after the container has been severed from the web. When the mandrel 108 and mold cavity 118 are first moved to a closed position, cooperating annular shoulders 286, 288 formed in the mandrel block 110 and mold cavity 118 respectively are brought into engagement to seal off the predetermined drawn material area of the web which has been engaged by the mandrel 108. When the predetermined drawn material area is so sealed off from the remainder of the web, air under pressure is introduced substantially uniformly into the partially formed container so as to expand and press the container wall against the inner wall periphery of the mold cavity 118. The air under pressure can be introduced, for example, through the ports 290 of the mandrel 108 which, of course, is connected with a suitable source of air pressure (not shown). A vacuum or negative air pressure can be established through the mold cavity 118, if this is desired; but in either case, differential air pressure is established across the predetermined drawn areas or partially formed container to expand the same against the inner wall periphery of the female mold cavity 118.

Following the expansion of the predetermined drawn areas or partially formed container, the mandrel 108 and mold cavity 118 are advanced toward each other a slight amount so as to bring complementary cutting or shearing edges associated with the annular shoulders 286, 288 into cooperative engagement for cutting or shearing the container thus formed from the unformed remaining web material. This is the position of the cooperating molds in FIG. 11D of the drawings which occurs at approximately 225° of the mold cycle as can be seen in the timing diagram of FIG. 12. This cut-off in the mold technique is further explained in detail in U.S. Pat. No. 2,891,280, and thus further specific discussion thereof is unnecessary insofar as the present invention is concerned.

Following the cutting or severing operation, the mandrel and mold cavity 108, 118 respectively begin to relatively separate from one another, and a short time thereafter, the web clamps 150, 152 then open to disengage the remaining web portions or scrap web material therefrom. This is depicted in FIG. 11E of the drawings, which is shown at approximately 270° of the mold cycle. Once the remaining web portions or scrap web material is released from the mold clamps 150, 152, it can then be carried away by the scrap pick-off wheel 44, to be presently discussed which carries the scrap web material away from the rotary drum 42 to a granulator mechanism (not shown). As the mandrel and mold cavity 108, 118 respectively continue their relative separating movement, the knock-out mechanism 120 will eject and remove the container C to permit the carrying away thereof by the pneumatic tube 274, also to be presently described.

SCRAP PICK-OFF MECHANISM

As depicted in FIGS. 13–14 of the drawings, the scrap pick-off wheel is mounted to remove scrap at approximately 285° relative to the top, dead-center position of the rotary drum 42. The scrap S is removed after opening of the web clamps 150, 152 and during the relative separating movement of the mandrel 108 and mold cavity 118 which eventually leads to the ejection of the container C from the mold into the cup ejector tube 274.

The scrap pick-off wheel 44 comprises a rotating wheel 292 which is mounted for rotation about shaft 294 in a direction opposite to the rotary drum 42. The rotating pick-off wheel 292 includes fixed and moving gripper plates 296, 298, each having a plurality of aligned gripping fingers or teeth 300, 302 respectively. The moving gripper plate 298 is laterally movable along the shaft 294 by a cam/cam follower arrangement (not shown) which moves the gripping fingers 302 into gripping engagement with the gripping fingers 300 of the laterally fixed gripper plate 296 at approximately 285° from the top, dead-center position of the rotary drum 42. The scrap S is gripped by the rotating pairs of gripping fingers 300, 302 to carry the scrap S away from the rotary drum 42. A curvilinear stripper plate 304 is fixedly mounted relative to the moving pick-off wheel 292 in order to strip the scrap S from the rotating pairs of cooperating gripper fingers 300, 302 at a point where gravity is useful in carrying the scrap S to a granulator or the like. The scrap pick-off wheel 44 is synchronized with the rotating drum 42 so as to remove the scrap S without in any way interfering with the molding of containers on the rotary drum 42.

CUP REMOVAL MEANS

As generally shown in FIG. 2 of the drawings, a pneumatic container removing means 46 is included in the container molding station 40 and extends upwardly and outwardly away from the rotary drum 42 at a position which is approximately 300° from the top, dead-center position of the rotary drum 42. This is more clearly depicted in FIGS. 13–14 of the drawings wherein the pneumatic container removing means 46 comprises a hollow cup ejector tube 274 which is positioned adjacent mold cavities 118 beginning at approximately 310°. The cup ejector tube 274 includes a lower curved section 306 which generally follows the circular mold cavity placement for at least two mold cavities 118. On the side of the tube 274 which is adjacent the mold cavities 118, the curvilinear section 306 of the cup ejector tube 274 is provided with an opening 308 which intersects the curvilinear lower section 306 of the cup ejector tube 274 at an angle relative to the axis thereof, as best illustrated in FIG. 13, to enable the cup ejector tube to be mounted as close as possible to the mold cavities 118. This arrangement permits containers to be rapidly deposited, when ejected from the mold cavities 118, into the opening 308 of the cup ejector tube 274 so that the container C can be removed from the rotary drum 42 without any interruption of the continuous molding operation. A vacuum is established in the cup ejector tube 274 by means connected to a suitable air source (not shown) which assists in the lifting and the propelling of the container C to a collecting station which may include rim-rolling or forming means if desired.

From the foregoing it will now be appreciated that the continuous motion container molding machine is capable of extremely high-speed manufacture of well-formed, thin-wall plastic containers by utilizing various structural components and operating procedures not heretofore contemplated.

I claim:

1. A continuous motion container molding machine comprising an endless container molding station mounted for continuous rotary movement about its axis, means for feeding a heated web of thermoplastic material substantially tangentially to said endless container molding station and in a plane normal to the axis of the rotary molding station, circumferential web clamping means carried on said molding station for rotation therewith, means for moving said circumferential web clamping means relative to the rotational movement of said station and to coincide with the tangential path of said web relative to said station, and at least one pair of cooperating molds attached to said endless container molding station and being operable upon said thermoplastic web within said circumferential web clamping means in a direction substantially parallel to the axis of said endless container molding station when said web is clamped to said endless container molding station.

2. The machine as defined in claim 1 wherein said endless container molding station comprises a rotary drum.

3. The machine as defined in claim 1 wherein the axis of said endless container molding station is substantially parallel to the supporting surface upon which said machine rests.

4. The machine as defined in claim 1 wherein the axis of said endless container molding station is substantially normal to the supporting surface upon which said machine rests.

5. The machine as defined in claim 1 including a plurality of pairs of adjacently positioned molds circumferentially arranged about said endless container molding station.

6. The machine as defined in claim 1 wherein the web is moved in a predetermined arcuate path when clamped to said endless container molding station.

7. The machine as defined in claim 1 wherein the plane of the web when fed to said endless container molding station is substantially normal to the axis thereof.

8. The machine as defined in claim 1 wherein said means for feeding said web becomes inoperative after said web is clamped to said endless container molding station.

9. The machine as defined in claim 1 wherein said means for feeding said heated thermoplastic web includes web conveyor clip means for engaging said web in a limited area along the upper margin thereof.

10. The machine as defined in claim 9 wherein said web conveyor clip means is disengaged from said web after said web is clamped to said rotary container molding station.

11. The machine as defined in claim 9 including a plurality of adjacently positioned clip means and web clamping means, the conveyor clip means being sequentially disengaged from said web upon the sequential clamping of said web by individual web clamping means.

12. The machine as defined in claim 1 wherein said clamping means moves on a linear path coinciding with the tangential path of said web for an increment of movement prior to the clamping thereof.

13. The machine as defined in claim 9 wherein said clamping means follows a predetermined arcuate path on said forming station when clamped to said web.

14. The machine as defined in claim 1 including independent clamping means associated with each pair of cooperating molds.

15. The machine as defined in claim 1 including a plurality of adjacently positioned clamping means and cooperating molds circumferentially arranged about said endless container molding station.

16. The machine as defined in claim 1 wherein each circumferential web clamping means comprises a pair of opposed clamping elements positioned on opposite sides of said web and said cooperating molds includes a mold cavity and mandrel element also located on opposite sides of said web.

17. The machine as defined in claim 1 and including means for severing containers from said web after formation thereof by said cooperating molds.

18. The machine as defined in claim 17 wherein said means for severing said container from said web is associated with each pair of cooperating molds.

19. The machine as defined in claim 17 including means for removing containers from said endless container molding station.

20. The machine as defined in claim 19 wherein said means for removing containers comprises a pneumatic tube mounted adjacent to said endless container molding station.

21. The machine as defined in claim 19 and including means for gripping and carrying away the web scrap prior to the removal of said containers.

22. The machine as defined in claim 21 wherein said means for gripping and carrying away scrap web comprises a scrap pick-off wheel which is mounted for rotary movement opposite to the movement of said endless container molding station.

23. The machine as defined in claim 1 and including means for actuating said cooperating molds and clamping means, said last mentioned means providing lateral separating movement of the cooperating mold means and the clamping means in the event of web jam-up in the machine.

24. The machine as defined in claim 1 and including heating means for heating the web prior to molding thereof, said heating means being laterally displaceable from the web in the event of material jam-up in the machine.

25. A continuous motion container molding machine comprising a rotary container molding station including at least one pair of cooperating molds mounted for movement in a direction substantially parallel to the axis of said rotary container molding station, means for feeding a heated thermoplastic web in a substantially linear path to said rotary container molding station with the plane of said web being substantially normal to the axis of said rotary container molding station, clamping means for clamping said heated thermoplastic web to said rotary container molding station, said clamping means being formed to move on said linear path of said web during clamping of said web and thereafter to move in a predetermined arcuate path with said rotary container molding station, said clamping means being arranged to clamp off a predetermined material section from the remainder of the web for operation thereupon by the cooperating molds which are associated therewith, said cooperating molds including a complementary mold cavity and mandrel element disposed on opposite sides of the predetermined material section, means for relatively moving the mandrel element and the mold cavity toward each other to draw the predetermined heated section within the clamped area and provide a partially formed container, means for sealing off the pre-formed container from the remainder of the thermoplastic web, means for establishing a pressure differential within the partially formed container to expand it against the mold cavity to form the ultimate container configuration, and means for thereafter severing the container so formed from the remainder of the plastic sheet.

26. The machine as defined in claim 1, and means for adjusting the speed of feeding of said web to said molding station to be synchronized to the speed of said web clamping means moving on said tangential path.

27. The method of molding articles from a web of material fed tangentially to a rotating article molding machine having a plurality of circumferentially disposed article molding elements comprising, clamping said web on a perimeter at a position prior to the tangential intersection of said web with the periphery of said molding machine, carrying said web and said perimeter substantially linearly along the tangent line past said tangential intersection and contemporaneously producing sufficient clamping pressure to prevent any disturbance of the web material within said perimeter responsive to further movement of said web away from said tangent line, carrying said clamped perimeter and said web circumferentially of said machine for operation of said article molding elements within said perimeter, and repeating said foregoing steps.

References Cited
UNITED STATES PATENTS

| | | | |
|---|---|---|---|
| 2,027,915 | 1/1936 | Kux | 18—20R |
| 2,745,135 | 5/1956 | Gora | 264—268X |
| 3,069,725 | 12/1962 | Root | 18—5RX |
| 3,105,270 | 10/1963 | Fibish | 18—19R |
| 3,166,790 | 1/1965 | Keyes | 18—19R |
| 3,218,379 | 11/1965 | Edwards | 264—292X |
| 3,418,691 | 12/1968 | Hanoi | 18—20RR |

ROBERT L. SPICER, JR., Primary Examiner

U.S. Cl. X.R.

18—5R, 20R, 16.5; 264—310